United States Patent [19]

Neumeyer

[11] Patent Number: 4,770,112
[45] Date of Patent: Sep. 13, 1988

[54] COMBINATION SEEDING, TILLING AND FERTILIZING IMPLEMENT

[75] Inventor: Lowell H. Neumeyer, Des Moines, Iowa

[73] Assignee: Deere & Company, Moline, Ill.

[21] Appl. No.: 22,839

[22] Filed: Mar. 6, 1987

[51] Int. Cl.$^4$ ............................................. A01C 5/00
[52] U.S. Cl. .................................. 111/73; 111/85; 172/724
[58] Field of Search .................. 111/52, 73, 80, 83, 111/85, 86, 6, 7; 172/722, 724, 725, 730, 732, 733, 748–751, 753

[56] References Cited

U.S. PATENT DOCUMENTS

| | | | |
|---|---|---|---|
| 103,058 | 5/1870 | Krehbiel | 111/85 |
| 362,598 | 5/1887 | Billups | 172/749 X |
| 673,135 | 4/1901 | Denny | 111/85 |
| 1,328,375 | 1/1920 | Griffice | 111/85 |
| 1,613,092 | 1/1927 | Gallup | 172/722 |
| 1,717,911 | 6/1929 | Brewer | 111/7 |
| 2,159,652 | 5/1939 | Brunner | 111/86 |
| 2,874,656 | 2/1959 | Bennett | 111/7 |
| 2,925,056 | 2/1960 | Wade | 111/86 |
| 3,752,236 | 8/1973 | Foster | 172/753 |
| 3,854,429 | 12/1974 | Blair | 111/73 |
| 4,033,271 | 7/1977 | Williams et al. | 111/7 |
| 4,141,301 | 2/1979 | Coldren | 172/724 |
| 4,276,836 | 7/1981 | Pust | 111/86 |
| 4,372,229 | 2/1983 | Henthorn | 111/86 |
| 4,373,455 | 2/1983 | Friggstad | 111/86 |
| 4,417,530 | 11/1983 | Kopecky | 111/73 |
| 4,565,141 | 1/1986 | Kopecky | 111/7 |
| 4,580,507 | 4/1986 | Dreyer et al. | 111/73 |
| 4,607,581 | 8/1986 | Kopecky | 111/73 |
| 4,638,748 | 1/1987 | Kopecky | 111/73 X |
| 4,653,412 | 3/1987 | Clarke | 111/73 |
| 4,674,419 | 6/1987 | Kopecky | 111/73 |
| 4,726,304 | 2/1988 | Dreyer et al. | 111/73 |

FOREIGN PATENT DOCUMENTS

| | | | |
|---|---|---|---|
| 3246733 | 6/1984 | Fed. Rep. of Germany | 111/7 |
| 1520055 | 4/1968 | France | 111/80 |
| 200449 | 5/1983 | German Democratic Rep. | 111/6 |

OTHER PUBLICATIONS

Hiniker 6150 Sweep Seeder brochure, date stamped 19 Feb. 1987.
Vale Farms Ltd. Conserva Pak Seeder article, Jun. 1984.

Primary Examiner—James R. Feyrer

[57] ABSTRACT

An opener assembly for fertilizing, tilling and seeding in one pass. An opener body is removably attached to an upright support leg and mounts a replaceable fertilizer banding knife. A replaceable sweep blade fixed immediately behind the knife to slice weed roots and firm the seedbed. A seed plenum located above the sweep blade receives a stream of seed through a channel in the opener body and divides the seed into left- and right-hand rows which are sown over the firmed soil. The forward central portion of the sweep is notched and is received over the opener body closely adjacent to the fertilizer knife to provide a compact structure, and a mounting tab at the rear of the sweep cooperates with a bolt and captive nut arrangement to provide quick and easy replacement of the sweep. The entire opener body may be removed from the support leg to change an implement from one type of operation to another.

5 Claims, 4 Drawing Sheets

COMBINATION SEEDING, TILLING AND FERTILIZING IMPLEMENT

BACKGROUND OF THE INVENTION

The present invention relates generally to agricultural implements and more specifically to an implement capable of fertilizing, tilling and seeding in one pass.

Agricultural implements which can both apply fertilizer and seed in a single pass are widely used in farming operations. Such devices are shown by way of example in U.S. Pat. Nos. 4,276,836; 4,417,530; 4,565,141; 4,580,507; and 4,607,581. Many of the available devices are able to fertilize and distribute seed in a single pass, but are unable to effectively till the soil and slice weed roots during the same operation. Some of the devices are complex in structure and do not provide for easy changeover to other configurations such as for banding fertilizer only or drilling only, and changeover for different operations may require replacement of the entire shank assembly. In some of the devices, areas which are subject to wear are not easily replaceable so that repair or refurbishing of the unit is costly and time consuming.

BRIEF SUMMARY OF THE INVENTION

It is therefore an object of the present invention to provide an improved planting and fertilizing apparatus which will seed and fertilize in a single pass. It is still a further object to provide such an apparatus which also provides improved weed control during the pass. It is yet another object to provide such a structure wherein the parts which are subject to the most wear are easily replaceable and wherein changeover to other types of operation may be easily accomplished without replacing the entire apparatus.

It is still another object of the present invention to provide an improved apparatus for seeding and fertilizing in a single pass which is relatively simple and compact in construction, which is easily repaired, and which is capable of easy changeover from one type of operation to another type of operation. It is another object to provide such an apparatus which provides a split stream of sown seed and which bands fertilizer in a location offset from the seed while opening the soil only once to conserve soil moisture. It is a further object to provide such an apparatus which includes an easily replaceable sweep blade fixed behind a fertilizer banding knife to slice weed roots and firm the seedbed.

It is still another object of the present invention to provide an improved opener assembly for depositing seed and fertilizer into the soil wherein the assembly includes a replaceable knife located closely adjacent a replaceable sweep blade. It is a further object to provide such an assembly which is compact and relatively simple in construction and requires a minimum of attaching points to secure the knife and the sweep in position so that assembly and repair of the unit is facilitated. It is still another object to provide such an assembly having an opener body which can be quickly and easily removed from the support leg so that the implement may be easily changed over to another type of operation.

In accordance with the above objects, an opener assembly is provided which includes an opener body fixed to the lower portion of an upright leg on the support structure connected to the implement. The opener body includes a pair of narrowly spaced fore-and-aft extending sides, and a fertilizer knife having a connecting portion slidably received between the spaced sides is removably mounted on the body by a roll pin. A sweep having a forwardly located and centrally notched portion is slidably received over the opener body closely adjacent the fertilizer knife and is secured in position on the body by transversely extending support structure and by a releasable connector extending through a rear tab located on the sweep and threaded into the rear portion of the opener body. A seed plenum is supported above the sweep with the top surface of the sweep acting as the lower boundary of the plenum. The plenum opens rearwardly at two transversely spaced locations rearwardly and outwardly of the fertilizer knife to form two seed rows above the level of fertilizer placement. The sweep, which is supported immediately behind the knife, slices weed roots and firms the seedbed. The opener body channels the fertilizer stream to the rear of the fertilizer knife and the seed stream is directed onto the top side of the sweep blade and allowed to divide into a split stream. Seed is sown into distinct rows which permits a selective press wheel effect and provides a traditional field appearance with parallel spaced rows. By applying fertilizer below and offset from the seed rows, large quantities may be used if desired and placement of the fertilizer is relatively precise. The compact arrangement permits the soil to be only opened once to thereby conserve soil moisture. The knife and the sweep blade are each attached with a single fastener and therefore replacement of these parts can be accomplished quickly and easily. The entire opener body with the seeding and fertilizing components attached thereto can be quickly removed from the leg structure to convert the implement to other types of operations.

These and other objects, features and advantages of the present invention will become apparent to one skilled in the art upon reading the following detailed description in view of the drawings.

DESCRIPTION OF THE PREFERRED EMBODIMENT

Figure 1:
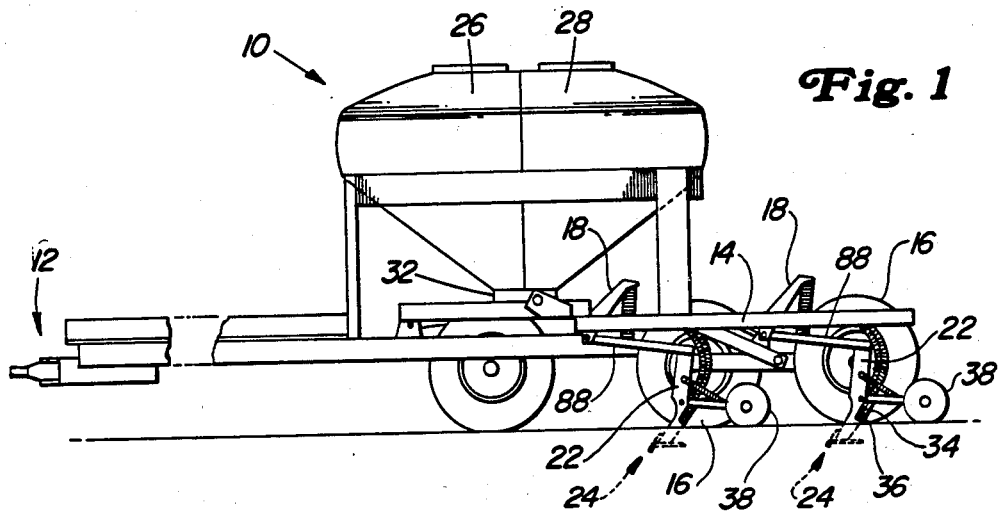
FIG. 1 is a side view of a seeding and fertilizing implement with the opener assembly of the present invention attached thereto.

Referring now to FIG. 1, therein is shown a seeding and fertilizing implement indicated generally at 10 having forward hitch structure 12 adapted for connection to a towing vehicle (not shown) for forward movement over a field. The implement 10 includes a main frame 14 supported by ground wheels 16 and carrying a plurality of transversely spaced spring shank assemblies 18. The shank assemblies 18 include upright legs 22 having lower ends which mount opener assemblies 24 adapted for opening the soil and depositing seed and fertilizer therein as the implement 10 is towed forwardly over the soil in the field-working position as shown in FIG. 1. The implement 10 includes separate seed and grain storage tanks 26 and 28 which open into conventional metering structure 32. An air system (not shown) moves the seed and fertilizer through a distribution system and through seed and fertilizer hoses 34 and 36 to the opener assemblies 24 for deposit into the soil. Press wheels 38 are mounted in trailing relationship to the openers 24 for firming the soil over the seeds.

Figure 3:
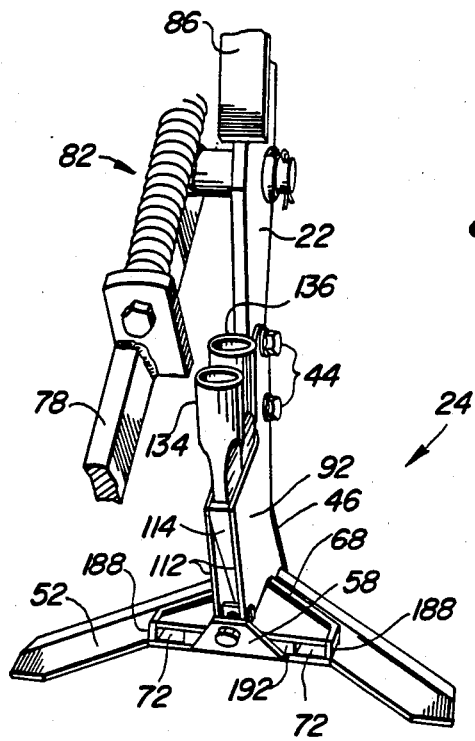
FIG. 3 is a rear perspective view of a portion of the opener assembly.

The opener assembly 24 includes a main opener body 42 removably mounted on the lower portion of the support leg 22 by mounting bolts 44. A fertilizer knife 46 is releasably connected to the lower forward portion of the opener body 42 by a roll pin 48. A centrally notched sweep 52 is slidably received over transversely extending support members 54 closely adjacent the fertilizer knife 46 in a generally horizontal configuration above the lowermost portion of the knife 46. The sweep 52 includes an upwardly turned tab 58 releasably connected by a fastener 62 to the lower aft portion of the opener body 42. A seed channel 64 (FIG. 7) is provided in the opener body 42 and opens into the top of a seed plenum 68 located on top of the sweep 52. The plenum 68 opens rearwardly at transversely spaced locations 72 (FIG. 3) to provide a pair of spaced seed outlets for depositing seed in rows on the firm soil not lifted by the sweep 52. A fertilizer channel 76 is provided in the opener body 42 forwardly of the seed channel 64 and opens behind the fertilizer knife 46 to deposit fertilizer in the soil opened by the knife 46 below the level of the sweep so that the fertilizer is offset below the rows of seed placed by the plenum 68 above the level of the sweep 52.

The press wheels 38 are supported in pairs from a trailing arm 78 pivotally connected to the leg 22 directly above the connecting bolts 44. A down pressure spring assembly 82 connected between the leg 22 provides adjustable down pressure for the wheels 38 to firm the soil over the individual rows of seed.

Figure 7:
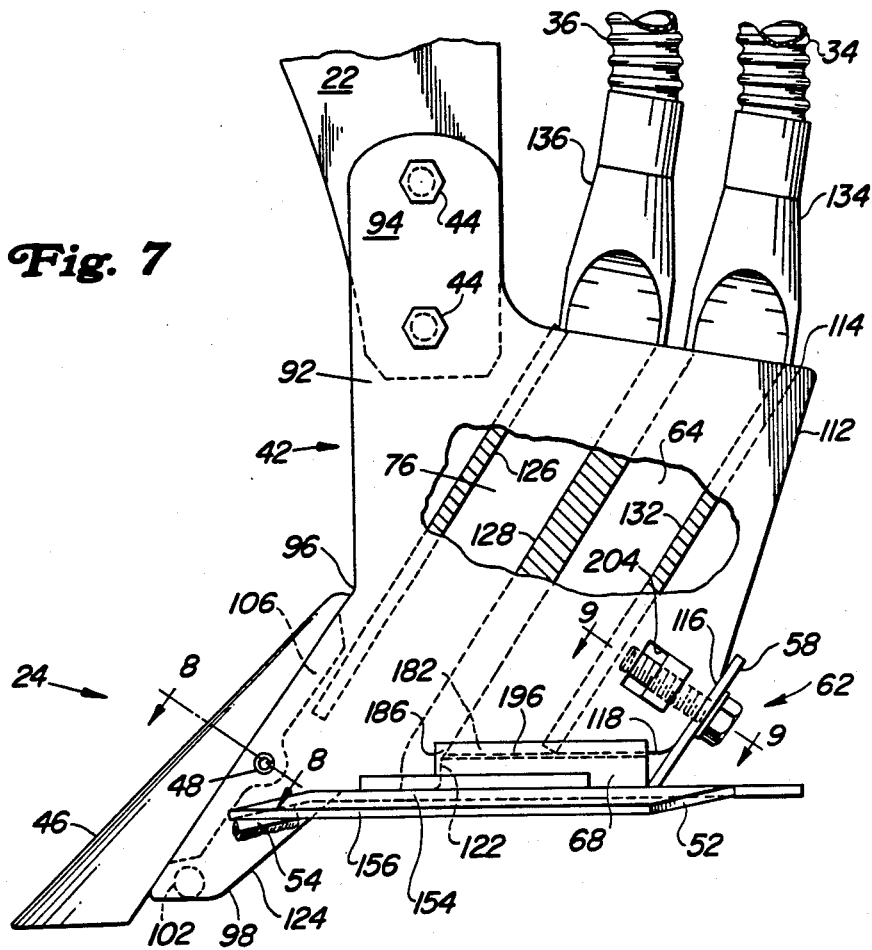
FIG. 7 is an enlarged side view, partially broken away, of the opener assembly with the fertilizer knife and sweep blade attached thereto.

The upright support leg 22 is generally of a metal platelike construction with a reinforcing member 86 welded to the rear edge of the plate. The top of the leg 22 is fixed to the rear end of a drawbar 88 (FIG. 1) which is part of the shank assembly 18. The fore-and-aft dimension of the leg 22 narrows near the lower end which supports the opener body 42 (FIG. 7). The two bolts 44 are vertically offset from one another and extend through holes in the opener body 42 and corresponding holes in the lower portion of the leg 22. By simply removing the two bolts 44, the opener body and corresponding attached components can be removed from the implement so that the implement may be easily converted, for example to a hoe drill, for a different type of operation.

Figure 2:
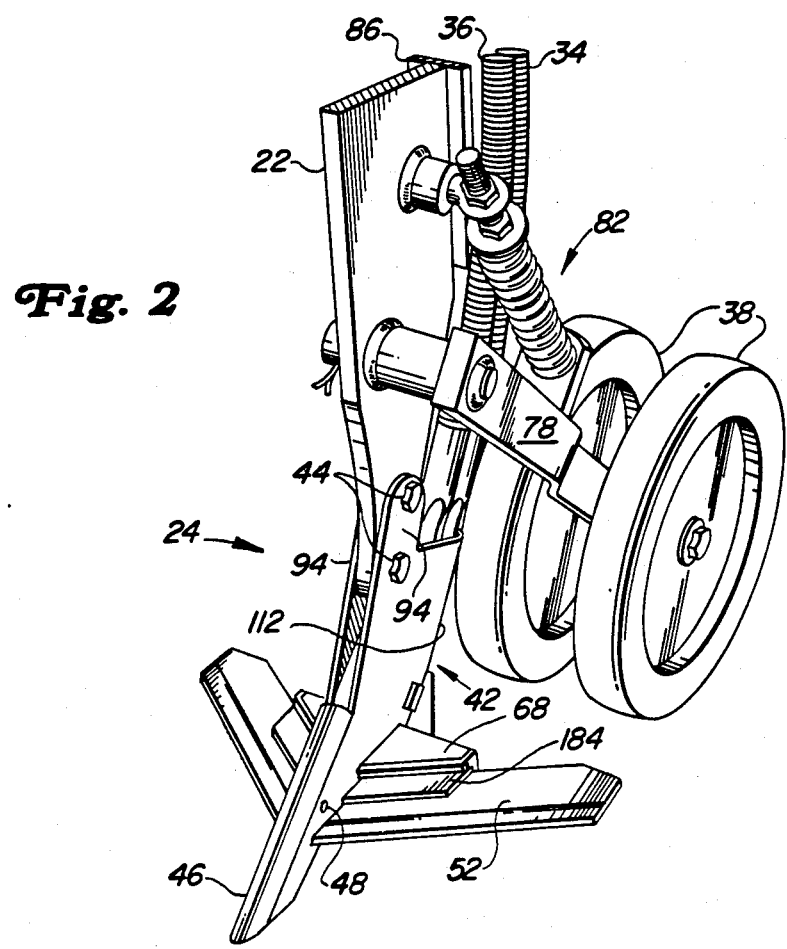
FIG. 2 is a front perspective view of the opener assembly utilized with the implement of FIG. 1.
Figure 8:
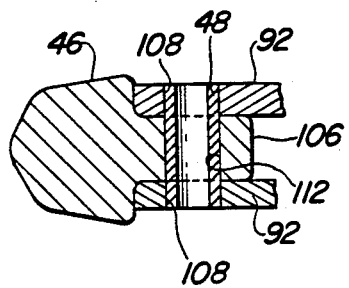
FIG. 8 is a sectional view taken essentially along lines 8—8 of FIG. 7.

The opener body 24 includes a pair of spaced upright side members 92 which open in the forward direction (FIG. 2) and which include upward projections 94 which embrace the sides of the leg 22. The forward edges of the side members 92 extend downwardly and forwardly from locations 96 to lower forwardmost ends 98 (FIG. 7) which are connected and maintained in generally parallel relationship by a transverse connecting member 102. The fertilizer knife 46 is fabricated from a wear-resistant material and includes a rear narrowed connecting portion 106 which is slidably received between and embraced by the side members 92 with the widened portion of the knife 46 abutting against the forward edge of the side members as shown in FIG. 8. Apertures 108 in the side members 92 and a corresponding aperture 112 in the fertilizer knife 46 are aligned and the roll pin 48 is inserted to secure the knife in position on the opener body 42 with the lower end of the knife 46 extending below the lower forwardmost end 98 and below the level of the sweep 52.

The side members 92 extend rearwardly in generally parallel relationship to rearward edges 112 which extend downwardly and slightly forwardly from top edges 114 to parallel edges 116 which have an increased angle toward the forward direction. The plates include rear lower edges 118 which are stepped downwardly at locations 122 and extend forwardly therefrom to the rearmost edges 124 of the lower end 98.

Downwardly and forwardly extending transverse webs or connectors 126, 128 and 132 extend between the side members 92 and define the seed and fertilizer channels 64 and 76. Hose couplers 134 and 136 are connected between the hoses 34 and 36 and the seed and fertilizer channels 64 and 76, respectively, to direct seed and fertilizer from the tubes 34 and 36 to the narrower channels 64 and 76, respectively. The opener body 42 channels the fertilizer stream to the rear of the fertilizer knife 46 below the sweep 52.

Figure 4:
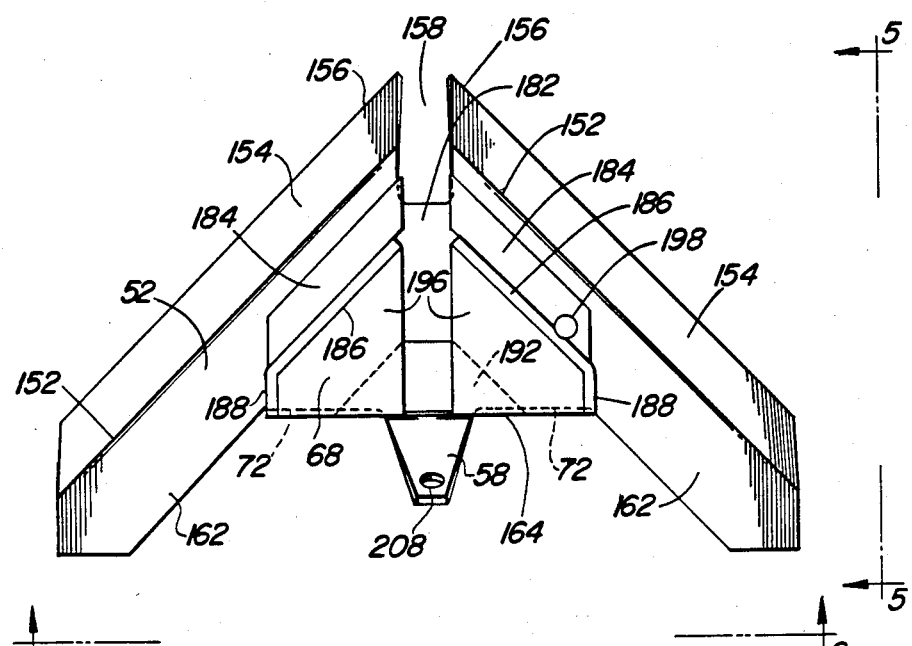
FIG. 4 is a top view of the replaceable sweep blade utilized with the opener assembly and showing the seed plenum supported thereon prior to assembly.
Figure 5:
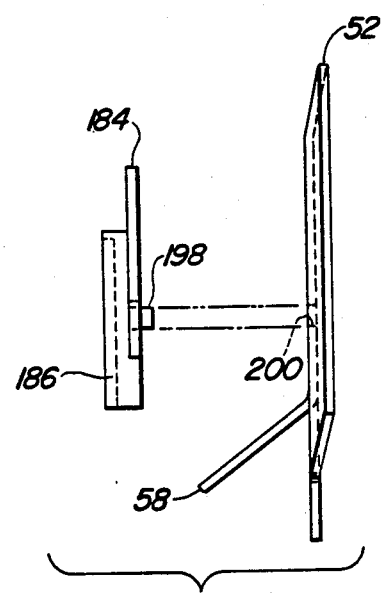
FIG. 5 is an exploded view taken essentially along lines 5—5 of FIG. 4.
Figure 6:
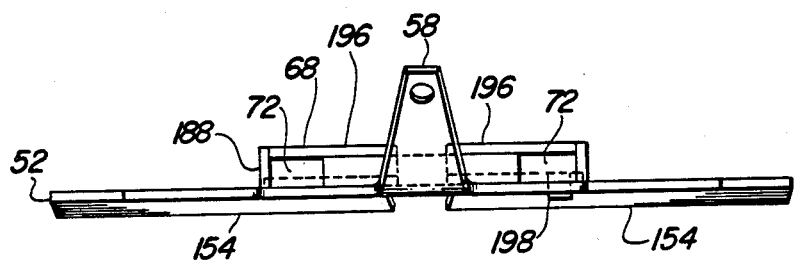
FIG. 6 is a view taken along lines 6—6 of FIG. 4.

The sweep 52 includes a pair of transversely extending blades 152 having slightly downturned front portions 154 with leading edges 156. The forward central portion of the sweep is notched at location 158. The sweep blades 152 include rear portions 162 which are substantially horizontal in the working position and which are connected from a central location by a web or connecting portion 164 (FIG. 4). The tab 58 is an integral portion of and extends upwardly from the web 164.

The seed plenum 68 rests on the sweep 52 with the web portion 164 forming the bottom of the plenum. The plenum 68 opens upwardly at a central location 182 (FIG. 4) into the seed channel 64 (FIG. 7). A pair of identically shaped lower plates 4 diverge rearwardly from the sweep notch 158 (FIG. 4) and have leading edges which are generally parallel to the leading edges 156 of the corresponding wings 154 of the sweep 52. Upright side walls 186 are connected to the rear edges of the plates 184 and define a leading wall of the plenum 68. Short fore-and-aft extending walls 188 extend rearwardly from the forward walls 184. A partition 192 extends across the rear of the opening 182, behind the seed channel 64, and diverges rearwardly and outwardly on either side of the tab 58 and with the walls 188 define the transverse dimensions of the opening 72. Therefore, as best seen in FIG. 4, rearwardly divergent seed channels are formed within the plenum 68 which open at the outlets 72. The top of the plenum 68 is closed by a pair of top plates 196. The plenum 68 is fabricated so that there is symmetry with respect to the fore-and-aft centerline through the sweep 52 to assure that the seed which enters from the hose 34 and the seed channel 64 in the air stream is split evenly between the outlets 72. The plenum 68 may be cast as an integral portion of the opener body 42. Alternatively, as shown in FIGS. 4–7, the plenum 68 is fabricated as a separate weldment and a one of the plates 184 includes a downwardly projecting pin 198 which keys into a corresponding hole 200 in the rear portion 162 of one of the wings 154 to locate the plenum with respect to the sweep 52 and facilitate assembly of the sweep and plenum onto the opener body 42. The plenum 68 is fabricated to provide as low a profile as possible and to provide smooth soil flow over the sweep.

Figure 9:
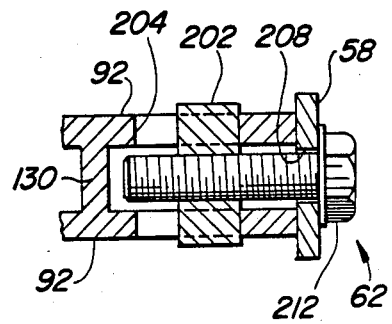
FIG. 9 is a sectional view taken essentially along lines 9—9 of FIG. 7.

As shown in FIGS. 7 and 9, the fastener assembly 62 includes a captive nut 202 held within a pair of slots 204 in the side members 92 just rearwardly of the seed channel 64. The tab 58 includes an aperture 208 which receives a bolt 212. The bolt 12 is threaded into the captive nut 202 to releasably secure the sweep 52 in the field-working position on the opener body 42.

In operation the opener 24 is drawn forwardly through the soil and the fertilizer knife 46 forms a deep furrow in the soil. Fertilizer is delivered in an air stream through the hoses 36 and the channel 76 to a location directly behind the fertilizer knife 46 generally below the sweep 52. The sweep 52 cuts the roots of weeds and firms the soil which passes below the sweep. Seed delivered by an air stream through the hoses 34 passes through the seed channel 64 and into the plenum 68 where it is divided evenly between the outlets 72. The seed is deposited on the soil firmed by the sweep 52 in uniformly spaced rows, and the soil which flows over the sweep 52 and plenum 68 is then deposited on top of the rows of seed. The trailing press wheels 38 firm the soil over the seed. The only two components of the opener 24 which are subject to a considerable amount of wear, that is, the knife 46 and the sweep 52, may be quickly replaced when worn. The fertilizer knife 46 may be removed by knocking out the roll pin 48. A new knife is then slidably received between the forward edges of the side members 92 and a new roll pin 48 is inserted to hold the knife in position. The sweep 52 may be removed by simply unscrewing the bolt 212 from the captive nut 202, lowering the rear end of the sweep 52 and sliding the sweep rearwardly away from the supporting members 54. To mount the sweep 52, the portion of the sweep adjacent the notch 158 is slid forwardly over the supports 54 and the rear of the sweep is lifted. The bolt 212 is then inserted through the hole 208 of the tab 58 and threaded into the captive nut 202 to secure the sweep 52 in position.

Having described the preferred embodiment, it will become apparent that various modifications may be made to the device without departing from the scope of the invention as set forth in the following claims.

I claim:

1. An opener assembly adapted for forward movement through the soil for depositing material in the soil, said assembly including:
    an opener body having transversely spaced side members and an upright material channel extending between the side members;
    a sweep having transversely extending wings and a notched portion located between the wings;
    said opener body including support means for slidably receiving the sweep with the notched portion of the sweep embracing the side members;
    securing means for removably fixing the sweep in a field-working position with respect to the opener body;
    an upright knife, and means removably mounting the knife on the opener body forwardly adjacent the sweep;
    wherein the sweep includes soil-lifting structure for lifting soil over the sweep and the material channel opens into the top of the sweep for depositing material below the soil lifted by the sweep, and wherein the knife includes a lowermost portion located below the sweep, and means for channeling material to the soil behind the lowermost portion;
    a plenum located above the sweep, the sweep defining the bottom of the plenum; and
    wherein the sweep includes a transversely extending web portion, and said plenum is located above the web portion, and a centrally located tab extending upwardly behind the plenum, said securing means including means for releasably connecting the tab to the opener body.

2. The invention as set forth in claim 1 wherein the side members define a forwardly opening upright portion and the upright knife includes a rearward projection received in the upright portion.

3. The invention as set forth in claim 1 wherein the notched portion is located at the forward portion of the sweep and is received by the opener body by sliding the sweep forwardly with respect to the body.

4. The invention as set forth in claim 3 wherein the support means includes transversely projecting members located adjacent the lower forward portion of the opener body, and wherein the forward portions of the sweep adjacent the notch are supported on the projecting members in the field-working position.

5. The invention as set forth in claim 1 wherein the plenum is symmetrical about a fore-and-aft extending centerline and includes outlets transversely spaced on each side of the centerline for depositing material in spaced rows.

* * * * *